Patented Nov. 28, 1944

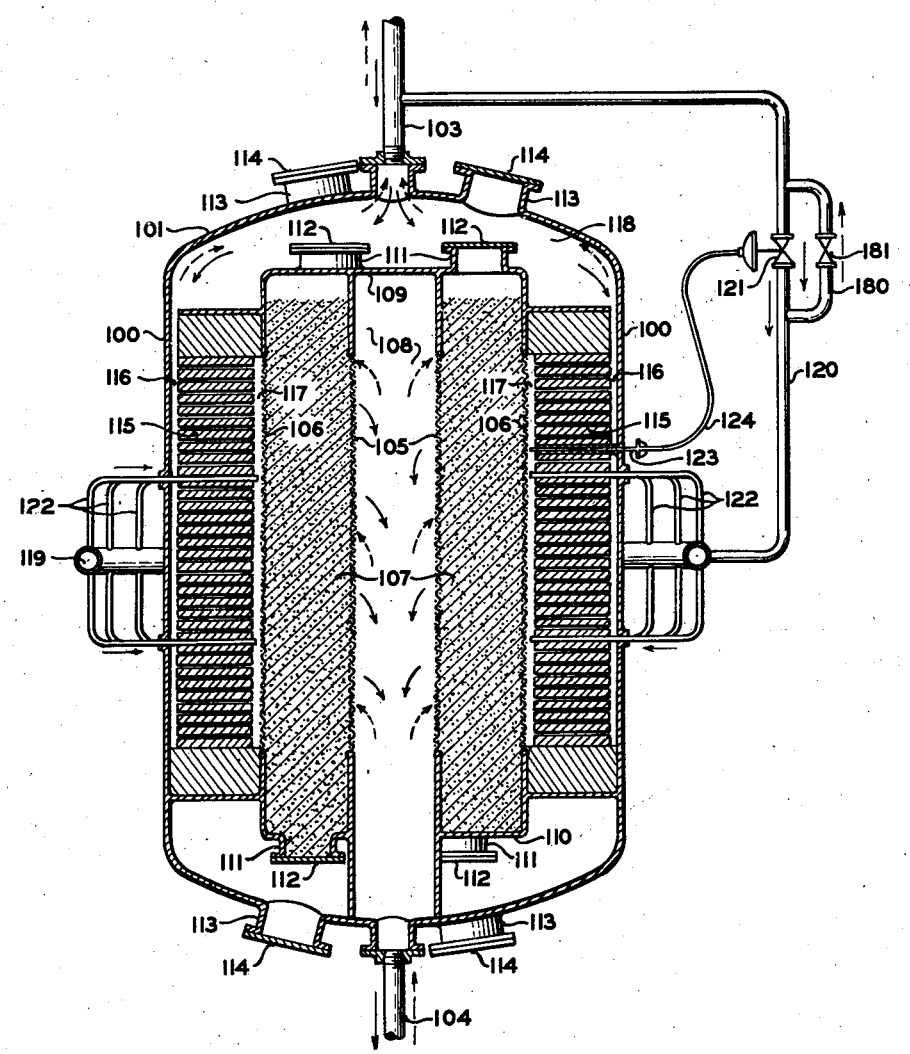

2,363,738

UNITED STATES PATENT OFFICE 2,363,738

CATALYTIC REACTOR

Percy Mather and Lev A. Mekler, Chicago, Ill., assignors to Universal Oil Products Company, Chicago, Ill., a corporation of Delaware Application August 5, 1939, Serial No. 288,509

2 Claims. (Cl. 23—288)

This invention relates to an improved type of reaction vessel adapted to permit the carrying out alternately of catalytically promoted conversion reactions and reactivation of the contained catalyst.

In many endothermic processes for the catalytic conversion of hydrocarbons such as, for example, catalytic cracking, dehydrogenation, aromatization, cyclization and the like, it is essential to periodically remove from the catalyst bed heavy carbonaceous materials deposited therein during the conversion reaction by diverting the stream of hydrocarbon reactants from the reaction vessel containing the catalyst and deposited carbonaceous material at relatively frequent intervals and passing a stream of hot oxygen-containing gases through the catalyst bed, thereby effecting combustion of the carbonaceous deposits and thus reactivating the catalyst. In such operations, large quantities of heat are normally evolved in the exothermic reactivation step and this heat may advantageously be employed to supply at least a portion of the heat requirements of the endothermic conversion step.

One of the primary objects of the invention is to provide a reactor in which heat generated during the exothermic reactivating step, in a process such as above outlined, is transferred to the succeeding endothermic conversion step conducted in the same reactor. This is accomplished by providing a reaction vessel containing separate beds of catalytic material and refractory material of high heat capacity, with provision for passing hot combustion gases issuing from the catalyst bed during reactivation in direct contact with the refractory bed to heat the latter and with provision for passing all or a regulated portion of the stream of reactants to be converted during the subsequent conversion step in direct contact with the hot refractory mass prior to its contact with the catalyst, whereby to supply heat to the reactants for the endothermic conversion step.

The novel and advantageous features of the invention can best be explained with reference to the accompanying drawing, which represents a cross-sectional elevation of one specific form of the improved type of reactor provided by the invention. It will be understood, of course, that many other specific forms incorporating some or all of the novel and advantageous features herein provided may be devised by a skilled mechanic from the teachings of the present disclosure and it is therefore not intended to limit the invention in its broader sense to the specific form of apparatus illustrated.

Referring to the drawing, the cylindrical outer shell 100 of the reactor is closed at the top and bottom by heads 101 and 102, respectively. A conduit 103 is provided in the top head which, in the case here illustrated, serves as an inlet line for reactants and as an outlet line for spent reactivating gases. A conduit 104 is provided in the bottom head which serves as an outlet line for reactants and/or conversion products and as an inlet line for the hot oxygen-containing gases utilized to reactivate the catalyst.

Concentric spaced screens or grids 105 and 106 are provided in the central portion of the shell and the space provided therebetween is substantially filled with catalytic material indicated at 107. The space 108 enclosed by the inner cylindrical screen 105 is closed at the top by the member 109 which also closes off the upper portion of the space in which the catalyst bed is disposed. Space 108 communicates at its lower end with conduit 104. The lower portion of the space containing the catalyst bed is closed by member 110 and nozzle connections 111 or other suitable openings having removable cover plates 112 and communicating with the space provided between screens 105 and 106 in which the catalyst bed is disposed are provided in the end members 109 and 110, these cover plates and openings being accessible through nozzles or other suitable openings 113 having removable cover plates 114 provided in the top and bottom heads of the reactor, whereby spent catalyst which is no longer susceptible to satisfactory reactivation may be removed from the reactor when required, and replaced with fresh catalyst.

A concentric bed or mass 115 of refractory material of relatively high heat capacity, such as checkerbrick work, glazed tile shapes, metallic members or the like, the bricks or other individual members of the bed or mass preferably being of low porosity, is provided between the cylindrical outer wall 100 and the outer cylindrical screen 106 and is spaced from each to provide spaces 116 and 117 therebetween. The outer space 116 is closed at the bottom and open at the top to communicate at its upper end with space 118 provided between upper head 101 and member 109, and the inner space 117 is closed at both ends.

A header or conduit 119, communicating with conduit 103 through line 120 having valve 121 disposed therein, is provided about the outer shell of the reactor and branch conduits 122 connect header 119 directly with space 117.

Valve 121 may be manually operated, but preferably is a variable flow type of automatic control valve actuated in response to the temperature of the materials within or defined by screens leaving space 105—106 by means of a thermostat or other temperature sensitive device 123 communicating with the valve through line 124.

When conversion is taking place in the reactor the flow therethrough, as indicated by the arrows shown in solid lines, is as follows: The stream of hydrocarbon vapors to be converted passes from conduit 103 into space 118. The vapors flood space 116 between outer shell 100 and refractory mass 115 and pass through the latter to space 117 between the refractory mass and the catalyst bed and are heated during their passage through the refractory mass by heat stored within the latter during a previous period of reactivation. The heated vapors pass through screen 106 into and through the catalyst bed 107, wherein their conversion is accomplished and the resulting products pass through screen 105 into space 108 wherefrom they are removed through conduit 104.

Due to the heat given up by the hot refractory mass to the hydrocarbon vapors passing therethrough, the temperature of said mass will decrease as the operation progresses and in order to maintain the temperature of the heated hydrocarbon vapors entering the catalyst bed substantially constant, diminishing quantities of the vapors supplied to the reactor through conduit 103 by-pass the bed of hot refractory material by means of line 120, valve 121, header 119 and lines 122. A small decrease in the temperature of the vapors about to enter the catalyst bed operates through the temperature sensitive device 123 to restrict the opening through valve 121 and send larger quantities of the vapors through the hot refractory mass. Thus, the temperature of the vapors entering the catalyst bed and the conversion temperature maintained therein is kept substantially constant during the entire processing period.

When the catalyst mass requires regeneration, the flow through the reactor is reversed, as indicated by the arrows shown with broken lines, and oxygen-containing gases are directed through line 104 to space 108 wherefrom the pass through screen 105 into and through the catalyst bed 107, whereby carbonaceous material deposited during the previous processing step is burned from the catalyst particles. The resulting hot gases pass through screen 106 into space 117 and thence through the refractory mass 115 to which they give up a substantial portion of their heat and wherefrom they are directed through space 116 and space 118 to conduit 103 through which they are removed from the reactor.

In case the heat available from the hot reactivating gases leaving the catalyst bed is substantially more than that required by the reactants entering the catalyst bed in the subsequent processing period, the by-pass arrangement comprising lines 122, header 119 and line 120 may be employed to divert a regulated portion of the hot regenerating gases past the bed of refractory material in the reactor directly to line 103 and thereby reduce the heat supplied to the refractory mass. To permit this method of operation, a by-pass line 180 having control valve 181 disposed therein is provided around valve 121, valve 121 remaining closed and valve 181 being regulated to suit requirements when regeneration is taking place in the reactor and valve 181 remaining closed while valve 121 is regulated to suit requirements while process of the reactants is taking place in the reactor.

We claim as our invention:

1. A reaction vessel of the class described comprising, in combination, an outer shell provided with inlet and outlet conduits, means holding a mass of catalytic material arranged concentrically within said shell, separated layers of refractory material disposed concentrically about, extending in parallel arrangement with, separated from and arranged to form a space between it and said catalytic material within the interior of said shell, said separated refractory material comprising a series of laterally disposed spaced apart rings, means for passing fluids serially through said refractory material and said catalytic material from said inlet to said outlet conduits, said means including a foraminous wall member separating the catalytic material from the refractory material and a second foraminous wall member on the concentric inner surface of the catalyitc material, said second foraminous wall forming a space communicating with said outlet, and a separate valved conduit establishing direct communication between one of the first named conduits and the space between the bed of catalytic material and the refractory material.

2. A reaction vessel of the class described comprising, in combination, an outer shell provided with inlet and outlet conduits, means holding a mass of catalytic material arranged concentrically within said shell, separated layers of refractory material disposed concentrically about, extending in parallel arrangement with, separated from and arranged to form a space between it and said catalytic material within the interior of said shell, said separated refractory material comprising a series of laterally disposed spaced apart rings, means for passing fluids serially through said refractory material and said catalytic material from said inlet to said outlet conduits, said means including a foraminous wall member separating the catalytic material from the refractory material and a second foraminous wall member on the concentric inner surface of the catalytic material, said second foraminous wall forming a space communicating with said outlet, a separate valved conduit establishing direct communication between one of the first named conduits and the space between the bed of catalytic material and the refractory material, and means in said separate conduit comprising a valve operative in response to temperature variations in said space between the catalytic and refractory materials for controlling the quantity of fluid passed through said separate conduit.

PERCY MATHER.
LEV A. MEKLER.